US012647794B2

(12) United States Patent
Liu et al.

(10) Patent No.:     US 12,647,794 B2
(45) Date of Patent:          Jun. 2, 2026

(54) GENERATION OF NETWORK RESOURCE MANAGEMENT ARCHITECTURE FOR COVERAGE

(71) Applicant: Chang'an University, Xi'an City (CN)

(72) Inventors: Xinyi Liu, Xi'an City (CN); Yanchao Xing, Xi'an City (CN); Yun Meng, Xi'an City (CN); Wei Wang, Xi'an City (CN); Zijiao Huang, Xi'an City (CN); Yujie Shen, Xi'an City (CN); Xuerui Zhu, Xi'an City (CN)

(73) Assignee: Chang'an University, Xi'an City (CN)

( * ) Notice: Subject to any disclaimer, the term of this patent is extended or adjusted under 35 U.S.C. 154(b) by 204 days.

(21) Appl. No.: 18/353,446

(22) Filed: Jul. 17, 2023

(65) Prior Publication Data

US 2024/0397325 A1     Nov. 28, 2024

(30) Foreign Application Priority Data

May 22, 2023    (CN) .......................... 202310576950.8

(51) Int. Cl.
H04W 16/04          (2009.01)
H04L 41/40          (2022.01)

(52) U.S. Cl.
CPC ............. H04W 16/04 (2013.01); H04L 41/40 (2022.05)

(58) Field of Classification Search
CPC ...... H04W 16/04; H04W 28/16; H04L 41/40; Y02D 30/70
See application file for complete search history.

(56) References Cited

U.S. PATENT DOCUMENTS

2022/0312439 A1*    9/2022    Bajpai ................... H04W 84/18
2023/0199565 A1*    6/2023    Vannithamby ..... H04B 17/3913
(Continued)

FOREIGN PATENT DOCUMENTS

EP          3847841 B1 *    3/2023    ............ H04W 24/02

OTHER PUBLICATIONS

R. Verdone and S. Mignardi, "Joint Aerial-Terrestrial Resource Management in UAV-Aided Mobile Radio Networks," in IEEE Network, vol. 32, No. 5, pp. 70-75, Sep./Oct. 2018 (Year: 2018).*

*Primary Examiner* — Gary Mui
*Assistant Examiner* — Nancy Sixto
(74) *Attorney, Agent, or Firm* — Birchwood IP

(57)          ABSTRACT

A new generation of network resource management architecture for coverage is provided, which constructs a structure of "signal coverage+capacity coverage" by incorporating satellite, space-based, and ground access points to achieve large-scale regional signal coverage and local area capacity coverage. In the core network, a global resource orchestrator is added, and in the access network, local resource orchestrator and virtual network management and maintenance unit are added for multiple functional units of resource management and control. In terms of coverage structure, it is divided into three-dimensional dense capacity coverage and three-dimensional global signal coverage. The former consists of ground dense network and aerial ad-hoc network, respectively realizing high traffic density coverage and large connection three-dimensional coverage. The latter consists of ground network and satellite constellation, respectively realizing extended coverage towards low altitude and three-dimensional coverage towards space, sky, ground, and ocean.

9 Claims, 11 Drawing Sheets

(56) References Cited

U.S. PATENT DOCUMENTS

| 2023/0262025 A1* | 8/2023 | Krishan | H04W 8/26 |
| | | | 709/245 |
| 2024/0154901 A1* | 5/2024 | Robitzsch | H04L 45/306 |
| 2024/0349069 A1* | 10/2024 | Soulhi | H04W 16/18 |

* cited by examiner

GENERATION OF NETWORK RESOURCE MANAGEMENT ARCHITECTURE FOR COVERAGE

TECHNICAL FIELD

The present disclosure relates to the technical field of architecture design for network transmission and connection, in particular to a new generation of network resource management architecture for coverage.

BACKGROUND

On the basis of 5G, 6G has higher indicator requirements and more complex scene designs. On the one hand, 6G first to add satellites as base stations to the networking strategy. On the other hand, with the gradual maturity of drone communication technology, 6G proposed the concept of space base stations and aerial ad-hoc networks, using drones as communication base stations to jointly form resource cell on the access network side with ground base stations.

This poses new challenges in the establishment of resource cell and communication resource management. The network components are more complex, the network structure is more three-dimensional, and it requires to coordinate these complex network structures to achieve higher goals and achieve higher indicators. Obviously, traditional resource management and control structures are not competent.

SUMMARY

The objectives of the present disclosure is to provide a new generation of network resource management architecture for coverage, in order to solve the problems raised in the background mentioned above.

To achieve the above objectives, the present disclosure provides the following technical solution:

A new generation of network resource management architecture for coverage, including a network resource management architecture, wherein the network resource management architecture includes a global resource orchestrator, a local resource orchestrator, a virtualization network management and maintenance unit, and a controller with expanded protocol stack;

wherein the global resource orchestrator is deployed on a core network side and conduct overall management to the local resource orchestrator on an access network side;

the local resource orchestrator is deployed on the access network side, receives control data from the virtualization network management and maintenance unit, analyzes the data to generate an optimal resource cell coverage solutions combined with needs and indicators of different scenarios for various resource data and scenario data, and transmits the optimal resource cell coverage solutions to the virtualization network management and maintenance unit; and the virtualization network management and maintenance unit is located between a base station and the local resource orchestrator; the virtualization network management and maintenance unit is configured to collect information about the base station and the resource cell to report to the local resource orchestrator; and the virtualization network management and maintenance unit accepts resource cell adjustment solutions generated by the local resource orchestrator and adjusts the base station resource cell based on the optimal resource cell coverage solutions generated by the local resource orchestrator.

Preferably, the overall management of the local resource orchestrator by the global resource orchestrator includes coordinating an operation of the local resource orchestrator, receiving information reported by the local resource orchestrator and feedback from an user experience module, and overall regulating a functional entity on the access network side based on the received information.

Preferably, the local resource orchestrator includes coverage configuration functional domain, coverage performance management functional domain, and data reception preprocessing functional domain.

Preferably, the coverage configuration functional domain is configured to analyze and monitor a business configuration of a coverage business scene;

the coverage performance management functional domain is configured to analyze and predict a performance of the coverage business scene, and formulate a resource allocation adjustment solution for the resource cell; and the data reception preprocessing functional domain is configured to classify and process information and data received by the local resource orchestrator, and transmits the information and the data to various functional modules for internal requirements of the local resource orchestrator.

Preferably, an unique temporary identifier is generated by the core network, namely a GUGMI code, the global resource orchestrator assigns the GUGMI code to the user experience module, the global resource orchestrator registers with the network function repository functional entity, and synchronously submits mapping rules between the GUGMI code and the global resource orchestrator to the network function repository functional entity; a request signaling sent by the user experience module when accessing the core network includes a GUGMI identification code, the global resource orchestrator that receives information from the user experience module should request mapping rules from the network function repository functional entity, and according to the GUGMI code reported by the user experience module, index the global resource orchestrator that the user experience module requests to connect to.

Preferably, data interactions and signaling interactions in the core network adopt a hyper text transfer protocol; data and services provided by functional entities in the core network have attributes of resources in the hyper text transfer protocol; the hyper text transfer protocol provides an unified resource identifier for resources, and when there is a need for access by the functional entities, basic commands of using hyper text transfer protocol are transformed into a current signaling format of the core network through format conversion.

Preferably, the coverage configuration functional domain includes a coverage structure type generation module and a coverage monitoring feedback module; the coverage structure type generation module matches the reported scene information with standard data of various scenes stored inside the local resource orchestrator, generate a basic network configuration composition of the scene based on matching results, and send generated scene types to a resource control module and a coverage monitoring module;

the coverage monitoring feedback module is configured to detect various indicators, when the coverage structure type generation module generates scene types and sends the generated scene types to the coverage monitoring feedback module, and the coverage monitoring feedback module compares scene data with scene standards of target.

Preferably, the coverage performance management functional domain is mainly responsible for coverage resource management and control of the virtualization network management and maintenance unit managed by the local resource orchestrator, and the coverage resource management and control includes a channel prediction module, a resource reservation module, and a resource management and control module;

the channel prediction module is a functional module designed to ensure a quality of signal transmission, configured to predict qualities of several channels based on channel parameters, analyze path loss of each channel, calculate gain, and provide data for resource management;

the resource reservation module processes resource reservation services for different scenes; and the resource management module of the resource cell is configured to analyze and calculate received resource usage status, scene types and detection results, channel prediction results, and resource reservation results combined with a request of vOMC to generate a new resource cell generation solution and resource control solution.

Preferably, the data reception preprocessing functional domain includes a data reception module and a local resource panoramic representation module;

the data reception module is configured to receive all data and information received by the local resource orchestrator, classify the data based on identification of the received data, and send the classified data to required functional modules according to a protocol agreed upon between the data reception module and other local resource orchestrator functional module; and the local resource panoramic representation module is configured to convert a format of resource data, maps data in a data packet into a data table form using special mapping rules, and the functional module directly reads the resource data.

Preferably, the virtualization network management and maintenance unit receives control from the local resource orchestrator, regulates the resource cell, and collects necessary data for the local resource orchestrator and transmits the collected data to the local resource orchestrator.

Compared with the prior art, the advantageous effects of the present disclosure are as follows:

The present disclosure constructs a structure of "signal coverage+capacity coverage" by incorporating satellite, space-based, and ground access points to achieve large-scale regional signal coverage and local area capacity coverage. Based on this, a coverage oriented resource management architecture is designed. In the core network, a global resource orchestrator is added, and in the access network, local resource orchestrator and virtual network management and maintenance unit are added for multiple functional units of resource management and control. In terms of coverage structure, it is divided into three-dimensional dense capacity coverage and three-dimensional global signal coverage. The former consists of ground dense network and aerial ad-hoc network, respectively realizing high traffic density coverage and large connection three-dimensional coverage. The latter consists of ground network and satellite constellation, respectively realizing extended coverage towards low altitude and three-dimensional coverage towards the space, sky, ground, and ocean.

DETAILED DESCRIPTION OF THE EMBODIMENTS

Figure 1:
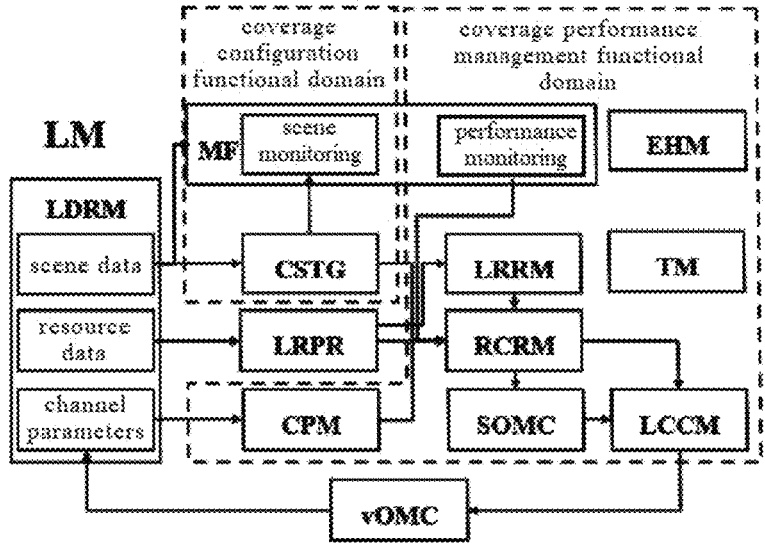
FIG. 1 is the architecture diagram of the local resource orchestrator of the present disclosure.
Figure 2:
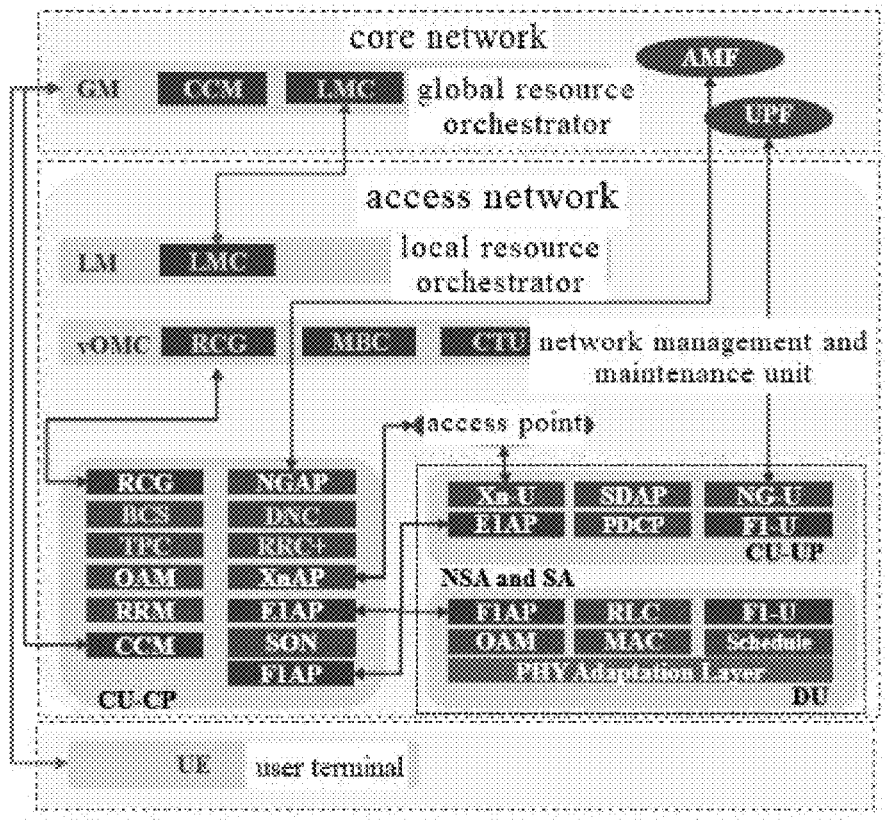
FIG. 2 is the architecture diagram of the global resource orchestrator of the present disclosure.
Figure 3:
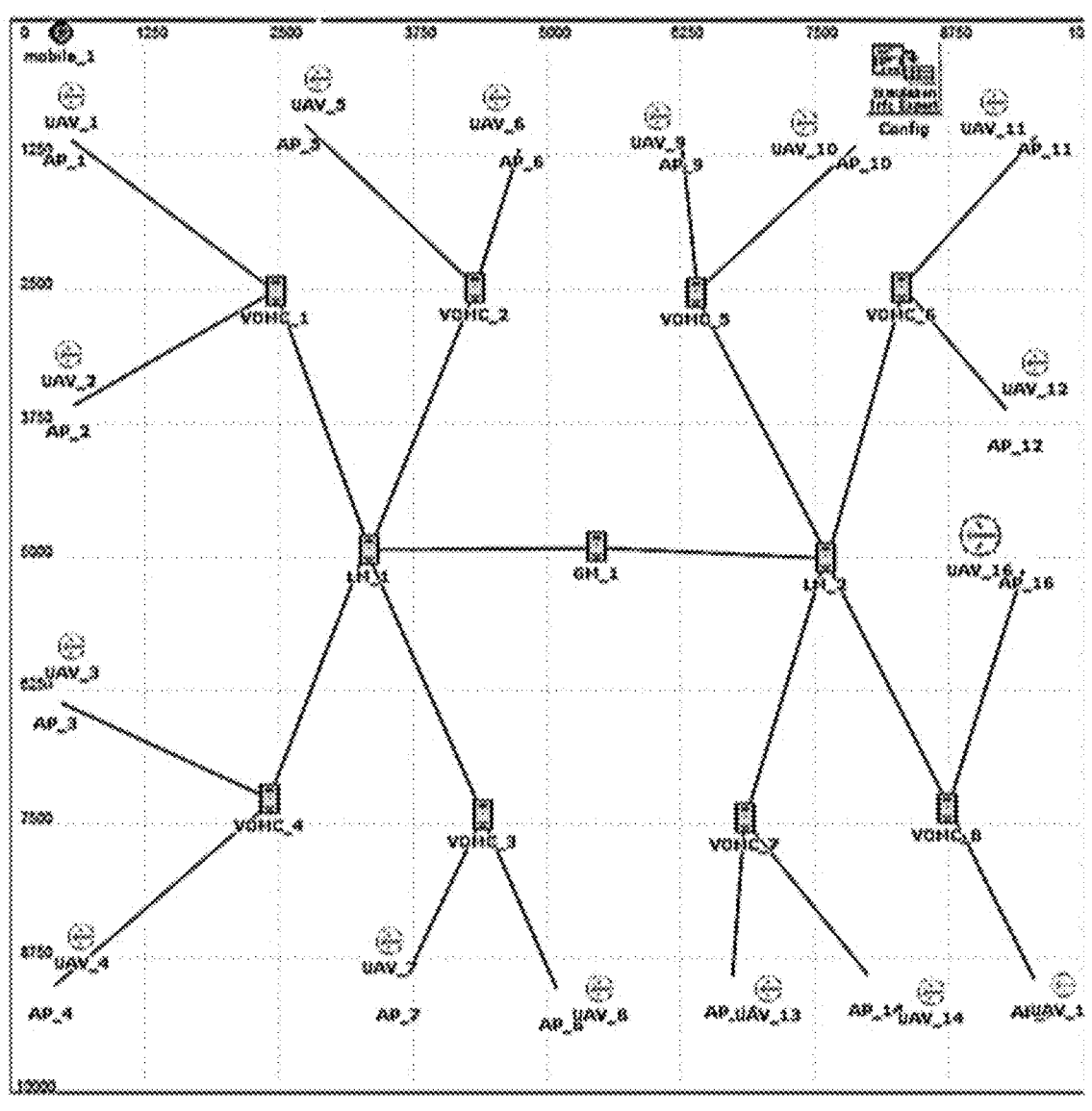
FIG. 3 is the network architecture in the simulation experiment of the present disclosure.

The following will provide a clear and complete description of the technical solution in the embodiments of the present disclosure, in conjunction with the accompanying drawings. Obviously, the described embodiments are only a part of the embodiments of the present disclosure, not all of them. Based on the embodiments in the present disclosure, all other embodiments obtained by the ordinary skilled person in the art without creative labor fall within the scope of the present disclosure.

Please refer to FIG. 1 to FIG. 12, the present disclosure provides a technical

Solution

A new generation of network resource management architecture for coverage, includes a network resource management architecture, wherein the network resource management architecture includes a global resource orchestrator, a local resource orchestrator, a virtualization network management and maintenance unit, and a controller with expanded protocol stack.

The global resource orchestrator is deployed on a core network side and conduct overall management to the local resource orchestrator on an access network side.

The local resource orchestrator is deployed on the access network side, receives control data from the virtualization network management and maintenance unit, analyzes the data to generate an optimal resource cell coverage solutions combined with needs and indicators of different scenarios for various resource data and scenario data, and transmits the optimal resource cell coverage solutions to the virtualization network management and maintenance unit.

The virtualization network management and maintenance unit is located between a base station and the local resource orchestrator; the virtualization network management and maintenance unit is configured to collect information about the base station and the resource cell to report to the local resource orchestrator; and the virtualization network management and maintenance unit accepts resource cell adjustment solutions generated by the local resource orchestrator and adjusts the base station resource cell based on the optimal resource cell coverage solutions generated by the local resource orchestrator.

Wherein, the overall management of the local resource orchestrator by the global resource orchestrator includes coordinating an operation of the local resource orchestrator, receiving information reported by the local resource orchestrator and feedback from an user experience module, and overall regulating a functional entity on the access network side based on the received information.

An unique temporary identifier is generated by the core network, namely a GUGMI code, the global resource orchestrator assigns the GUGMI code to the user experience module, the global resource orchestrator registers with the network function repository functional entity, and synchronously submits mapping rules between the GUGMI code and the global resource orchestrator to the network function repository functional entity; a request signaling sent by the user experience module when accessing the core network includes a GUGMI identification code, the global resource orchestrator that receives information from the user experience module should request mapping rules from the network function repository functional entity, and according to the GUGMI code reported by the user experience module, index the global resource orchestrator that the user experience module requests to connect to.

Data interactions and signaling interactions in the core network adopt a hyper text transfer protocol; data and services provided by functional entities in the core network have attributes of resources in the hyper text transfer protocol; the hyper text transfer protocol provides an unified resource identifier for resources, and when there is a need for access by the functional entities, basic commands of using hyper text transfer protocol are transformed into a current signaling format of the core network through format conversion.

The local resource orchestrator includes coverage configuration functional domain, coverage performance management functional domain, and data reception preprocessing functional domain. The coverage configuration functional domain is configured to analyze and monitor a business configuration of a coverage business scene; the coverage performance management functional domain is configured to analyze and predict a performance of the coverage business scene, and formulate a resource allocation adjustment solution for the resource cell; and the data reception preprocessing functional domain is configured to classify and process information and data received by the local resource orchestrator, and transmits the information and the data to various functional modules for internal requirements of the local resource orchestrator.

The coverage configuration functional domain includes a coverage structure type generation module and a coverage monitoring feedback module; the coverage structure type generation module matches the reported scene information with standard data of various scenes stored inside the local resource orchestrator, generate a basic network configuration composition of the scene based on matching results, and send generated scene types to a resource control module and a coverage monitoring module; the coverage monitoring feedback module is configured to detect various indicators, when the coverage structure type generation module generates scene types and sends the generated scene types to the coverage monitoring feedback module, and the coverage monitoring feedback module compares scene data with scene standards of target.

The coverage performance management functional domain is mainly responsible for coverage resource management and control of the virtualization network management and maintenance unit managed by the local resource orchestrator, and the coverage resource management and control includes a channel prediction module, a resource reservation module, and a resource management and control module. The channel prediction module is a functional module designed to ensure a quality of signal transmission, configured to predict qualities of several channels based on channel parameters, analyze path loss of each channel, calculate gain, and provide data for resource management; the resource reservation module processes resource reservation services for different scenes; and the resource management module of the resource cell is configured to analyze and calculate received resource usage status, scene types and detection results, channel prediction results, and resource reservation results combined with a request of vOMC to generate a new resource cell generation solution and resource control solution.

The data reception preprocessing functional domain includes a data reception module and a local resource panoramic representation module. The data reception module is configured to receive all data and information received by the local resource orchestrator, classify the data based on identification of the received data, and send the classified data to required functional modules according to a protocol agreed upon between the data reception module and other local resource orchestrator functional module; and the local resource panoramic representation module is configured to convert a format of resource data, maps data in a data packet into a data table form using special mapping rules, and the functional module directly reads the resource data.

The virtualization network management and maintenance unit receives control from the local resource orchestrator, regulates the resource cell, and collects necessary data for the local resource orchestrator and transmits the collected data to the local resource orchestrator.

Wherein, the global resource orchestrator and the local resource orchestrator are interconnected through NGAP. NGAP services are applied to the information exchange between wireless access networks and core networks in communication networks. NGAP consists of essential programs (EPs), which are the interaction units between access network nodes and core network elements. These elementary processes are defined separately and are intended to be used to construct complete sequences in a flexible manner. If the independence between certain EPs is limited, describe it under the relevant EP description. Unless otherwise specified by the limiting conditions, EPs can be called independently of each other as independent programs and can be activated in parallel.

The local resource orchestrator and the virtual network management and maintenance unit are connected interactively through the M1 interface. The M1 setting function allows the exchange of application level data required for the correct interoperability of the local resource orchestrator and the virtual network management and maintenance unit on the M1 interface. The M1 setting is started by the virtual network management and maintenance unit, and the M1 resource coordination function is used to transmit frequency resource sharing information between the local resource orchestrator and the virtualization network management and maintenance unit. In the case of splitting the coverage oriented resource management architecture, local resource orchestrator can merge outgoing messages from multiple virtualization network management and maintenance units, and distribute incoming messages to the involved virtualization network management and maintenance units to perform resource coordination.

The internal modules of the local resource orchestrator interact with each other through the L1 interface, which is used for information and data exchange between the internal functional modules of the local resource orchestrator. The signaling of the L1 interface only applies to the interaction between the internal functional modules of the LM module, requiring the function requester to send a request to the function provider. If the function provider is currently idle, the requester will respond with a confirmation message, and then the function requester will send the information to the function provider; If the function provider is in a busy state, the response message will reject the request from the function requester, and the requester will resend the request after waiting for a certain time interval.

The information interaction between the user experience module and the global resource orchestrator is achieved through NAS. The NAS protocol constitutes the highest layer of the control plane between the user experience module and the core network for 3GPP and non 3GPP access. The main functions of the protocol belonging to NAS are:

Support the mobility of user devices, including common programs such as authentication, recognition, general UE configuration updates, and security mode control programs;

Support session management program to establish and maintain data connections between terminals and data networks;

Provide parameter update information load in the NAS transmission process.

Embodiment

Simulate the above architecture, and the simulation scene is set to be a large-scale and dense user set, such as high-speed trains, trains, buses, and other manned transportation vehicles. When passing through a resource cell, the resource cell ensures the normal operation of its communication services.

The simulation experiment include:

Equipped with a new generation network architecture, the new generation network architecture realizes the regulation of drone base stations, thus achieving the function of resource reservation to meet the coverage needs of emergencies.

Comparative experiment, under the same scene, the 5G architecture incorporating virtualization technology and the 4G architecture are conducted simulation experiments. The structure of ordinary 4G and 5G networks is the same, but the types of network elements are limited to ordinary nodes in 5G and 4G networks.

The purpose of the simulation experiment is to test the signal coverage and capacity coverage capabilities of the architecture. Signal coverage refers to the maximum number of users who can provide services, and capacity coverage refers to the maximum transmission rate that can be achieved by the served users.

Signal coverage performance test simulation results analysis: In the full load user access experiment, when the number of base station service users is 30 and the number of internal users in the train subnet is 90, in the fixed base station mode, the ordinary architecture cannot quickly respond to user access needs. Compare the number of user disconnection, node online proportion, data delivery success rate, end-to-end delay, and throughput under different network architectures.

| Parameters | Value |
|---|---|
| Number of nodes | 90 |
| Number of users supported by the base station | 30 |
| Packet Interval | Exponential (0.25) |
| packet size | 15000 bits |
| User allocation rate | 5 G (10M) 4 G(3M) |
| Scene size | 10 km*10 km |
| Base station connection range | 1800 m |
| Base station handover indicators | IN(1450 m)/OUT(1500 m) |

Figure 4:
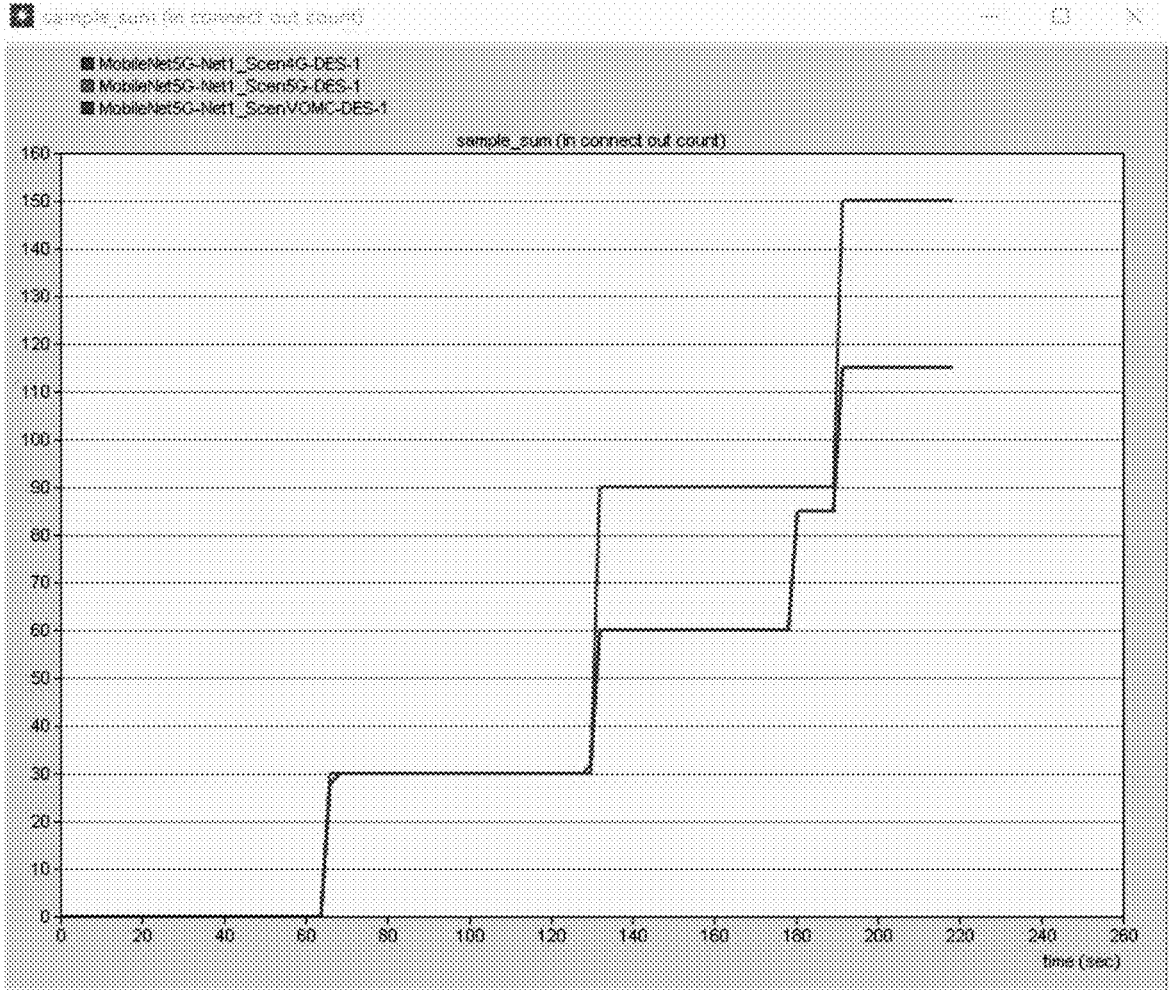
FIG. 4 is a comparison diagram of the number of disconnected connections in the signal coverage performance test simulation experiment of the present disclosure.

As shown in FIG. 4, the number of disconnected users is defined as the change in user status from connected to disconnected, indicating that the user disconnected the service during the switching process and was unable to successfully switch. Under the new generation architecture of LM-GM, the number of link disconnects is 0. The number of disconnected connections in 5G and 4G modes remains constant. Under the VOMC architecture, the number of connection disconnects is relatively high because UAV do not support timely during the switching process of VOMC, causing disconnection of a large number of nodes.

Figure 5:
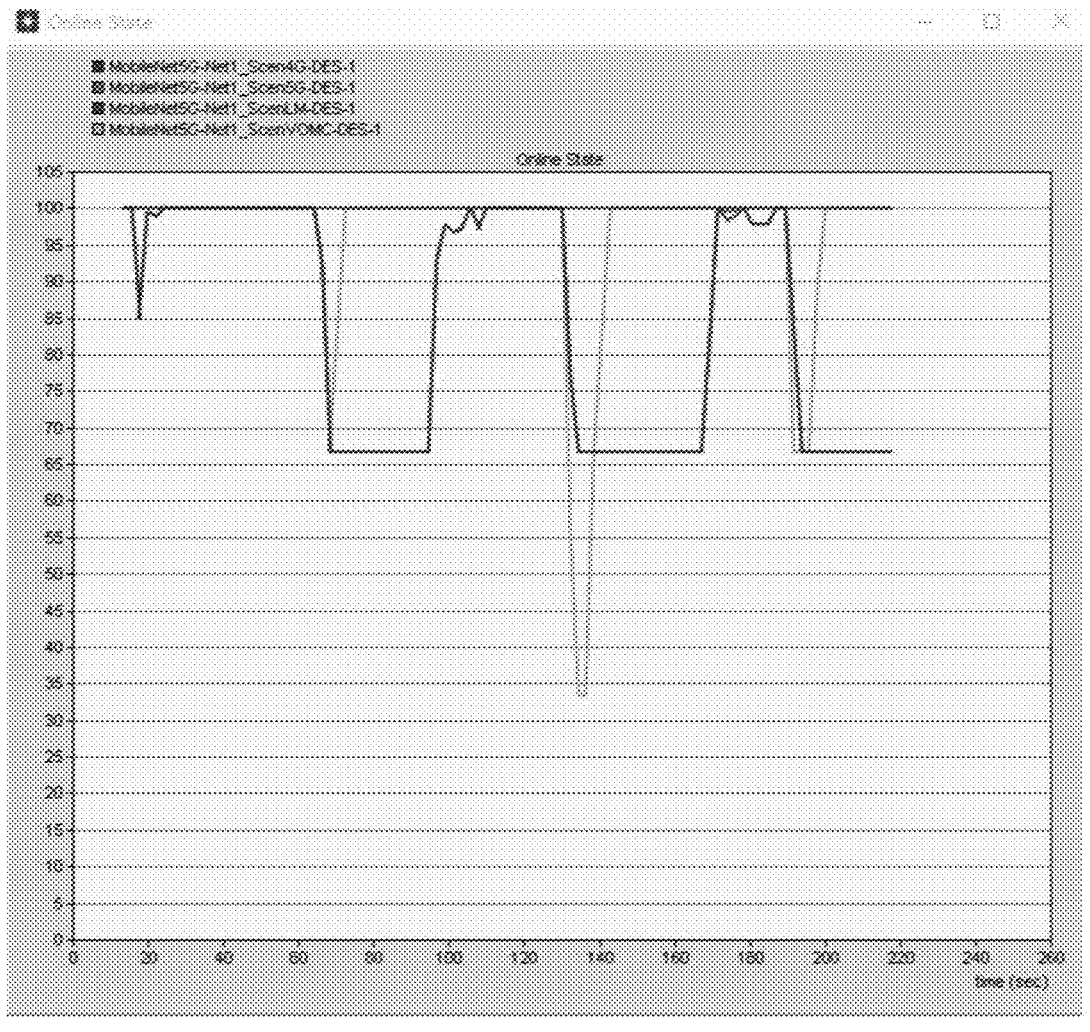
FIG. 5 is a comparison diagram of the online proportion of the signal coverage performance test simulation experiment nodes of the present disclosure.

As shown in FIG. 5, the online proportion of nodes is defined as the percentage ratio of the number of users connected to the base station to the total number of users. From FIG. 5, it can be observed that under the LM-GM architecture, the online percentage in the network is 100, indicating that nodes are always online and maintain a linked state. The LM-GM architecture can meet the actual situation where the number of users exceeds.

Figure 6:
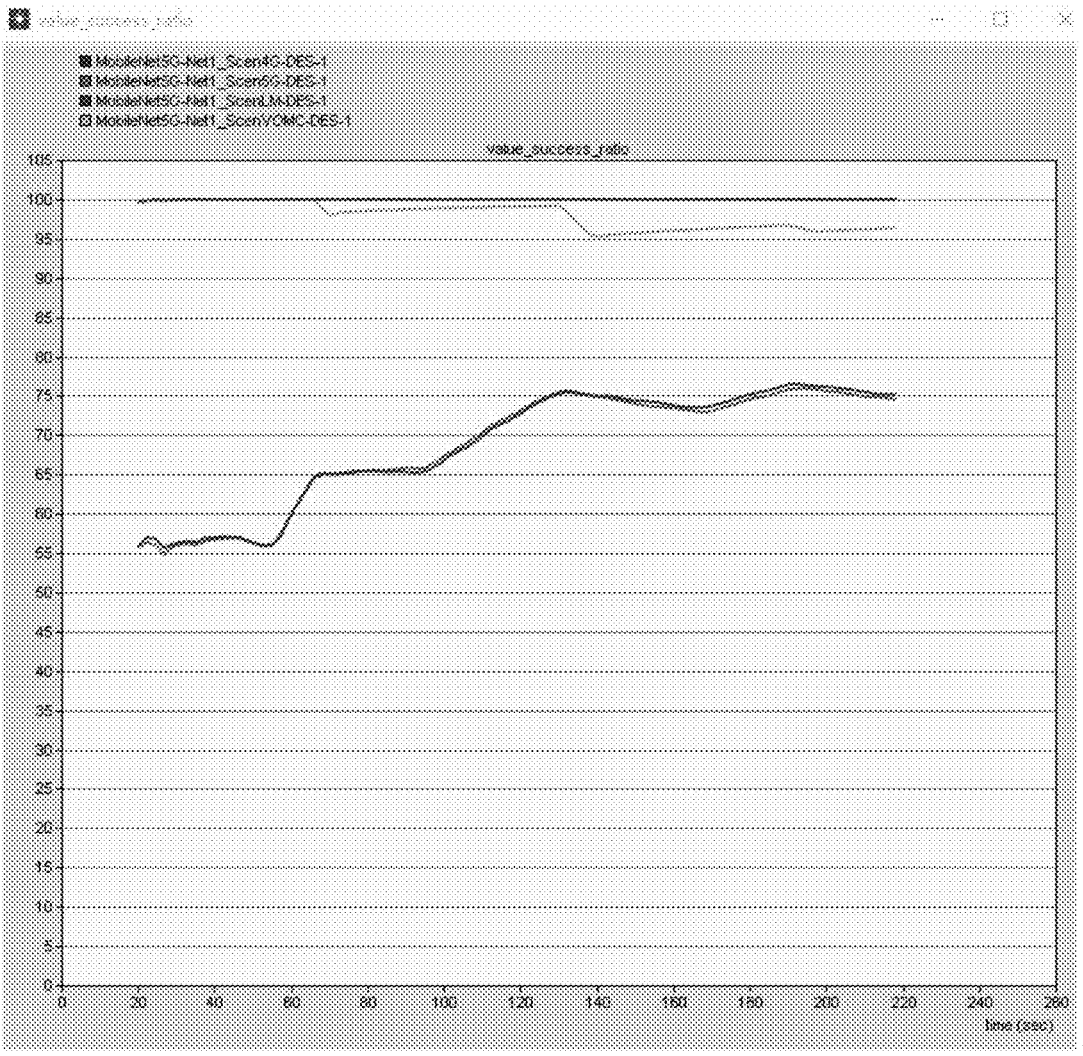
FIG. 6 is the success rate of data delivery in the signal coverage performance test simulation experiment of the present disclosure.

As shown in FIG. 6, the success rate of data delivery is defined as the ratio of successfully received data to the total number of data packets sent. It can be seen that after adopting the LM-GM architecture, UAV nodes can provide timely support, and users can receive sufficient access resources, so the delivery rate remains at 100. When using VOMC structure, UAV support is not timely enough, resulting in a decrease in success rate.

Figure 7:
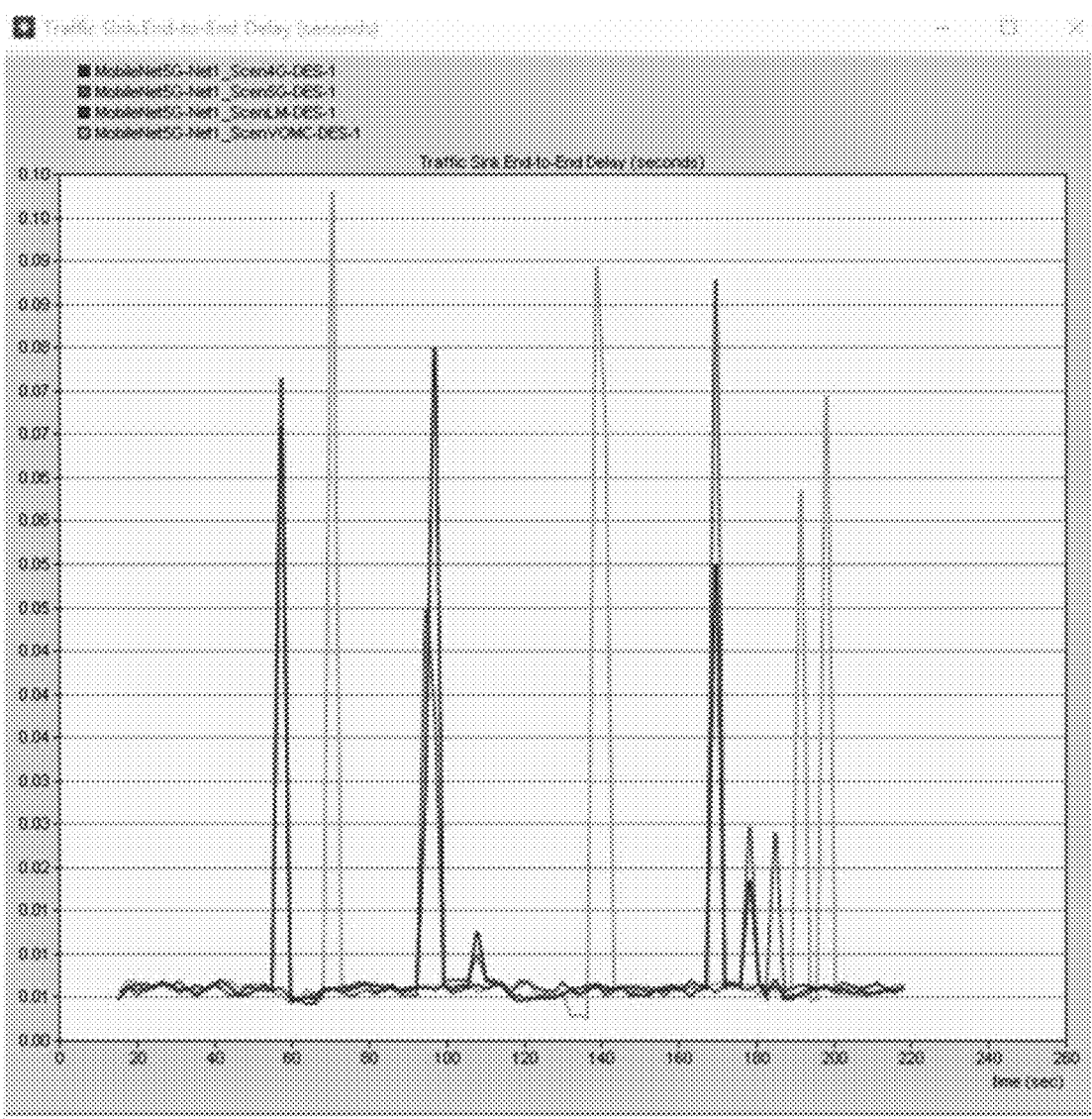
FIG. 7 is the end-to-end delay of the signal coverage performance test simulation experiment of the present disclosure.

As shown in FIG. 7, end-to-end delay is defined as the delay between the creation of a data packet and its arrival at the destination node. The end-to-end delay is shown in FIG. 7, the latency using LM-GM architecture is around 10 ms, and there will be significant latency jitter when using VOMC architecture and ordinary architecture. During the VOMC architecture, the base station only reports when the access load is full, so it cannot meet the scene of user surge.

Figure 8:
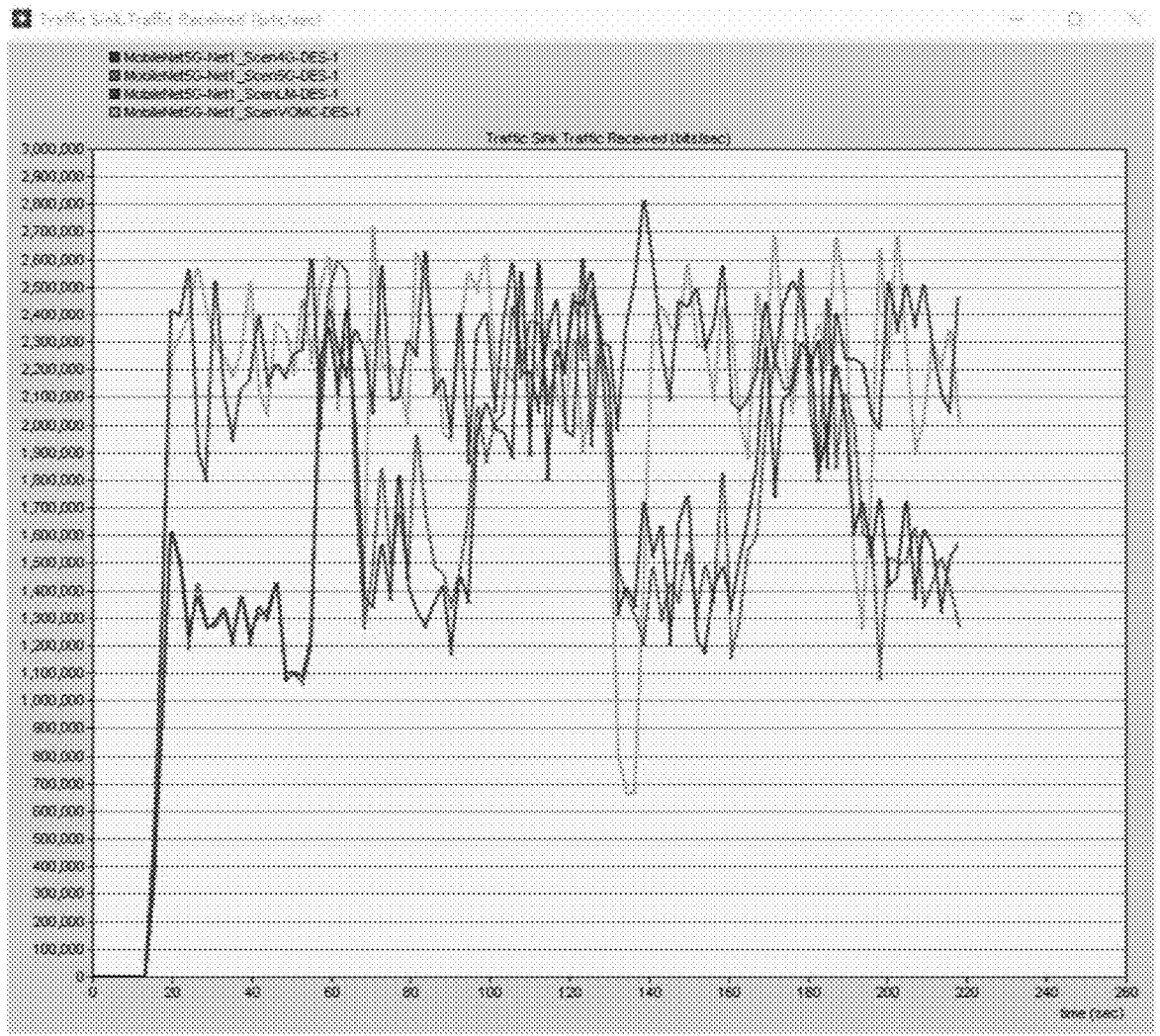
FIG. 8 is the throughput of the signal coverage performance test simulation experiment of the present disclosure.

As shown in FIG. 8, throughput is defined as the amount of data delivered successfully per unit time. As shown in FIG. 8, the network throughput under the LM-GM architecture is around 2.4 Mbps, which can maintain stability. In the VOMC architecture, there may be resource shortages during node switching, resulting in a decrease in throughput.

Analysis of simulation results for capacity coverage performance test: Unlike signal coverage performance test simulation, the number of users in this scene has decreased, but requirements for transmission rate of each user have increased significantly, so as to test the capacity coverage capability of the architecture. Given an usage quantity of 50, both LM-GM and general architecture modes can provide access services for users, but user services have the characteristic of sudden bursts. Adopting LM-GM architecture can schedule sufficient business resources for users in advance according to the plan.

| Parameters | Value |
|---|---|
| Number of nodes | 50 |
| Number of users supported by the base station | 30 |
| User load | 8 Mbps |
| User allocation rate | 6 Mbps |
| Scene size | 10 km*10 km |
| Base station connection range | 1800 m |
| Base station handover indicators | IN(1450 m)/OUT(1500 m) |
| Business On Status | Exponential (2) |
| Business Off Status | Exponential (5) |

Figure 9:
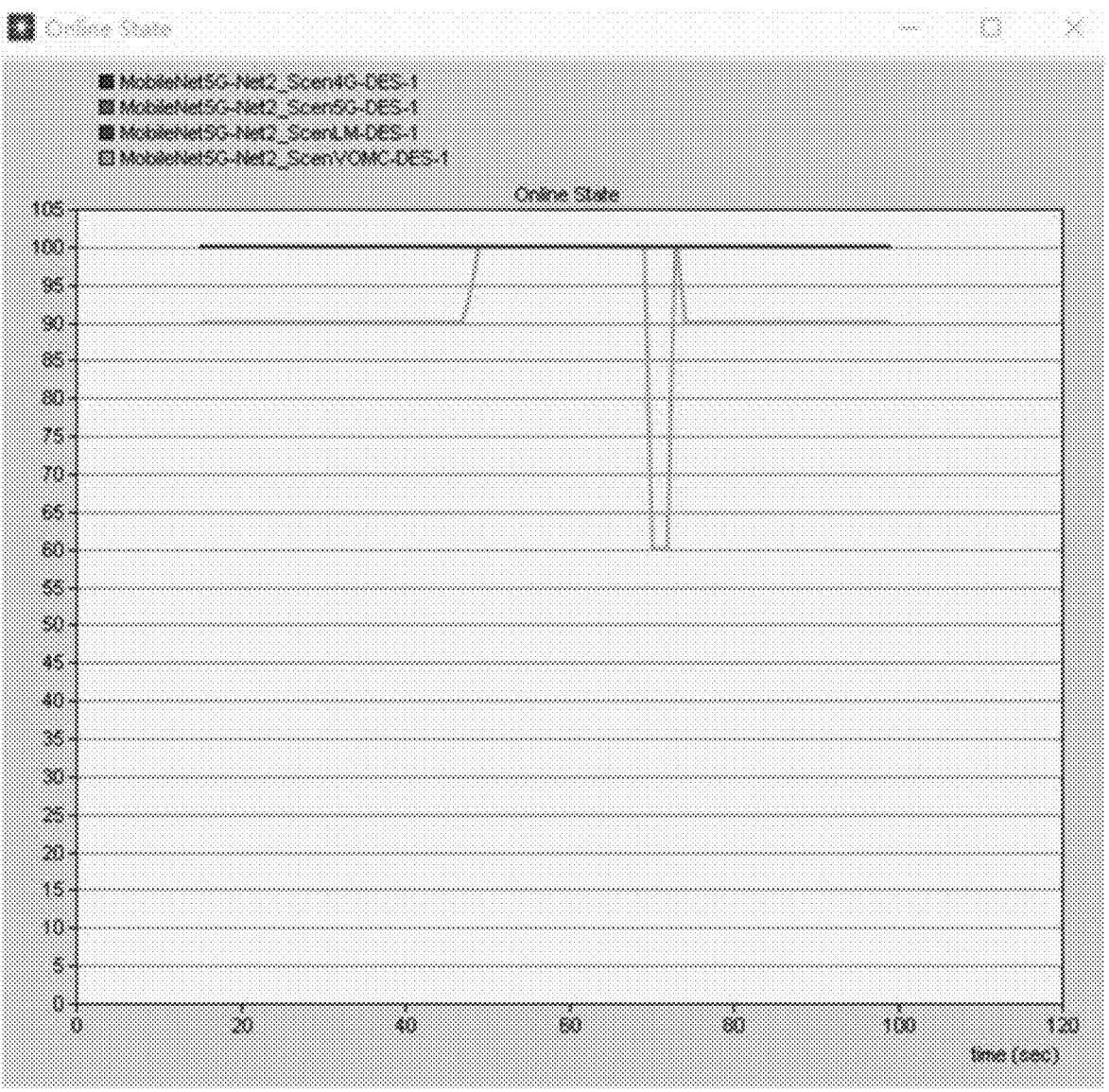
FIG. 9 is the online status of the capacity coverage performance test simulation experiment node of the present disclosure.

As shown in FIG. 9, the online proportion of nodes is defined as the percentage ratio of the number of users connected to the base station to the total number of users. From FIG. 9, it can be observed that under the LM-GM architecture, the online percentage in the network is 100, indicating that nodes are always online and maintain a linked state. The LM-GM architecture can meet the actual situation where the number of users exceeds. The VOMC architecture suffers from delayed resource release during switching, as well as delayed UAV node support, resulting in a decrease in online proportion of nodes.

Figure 10:
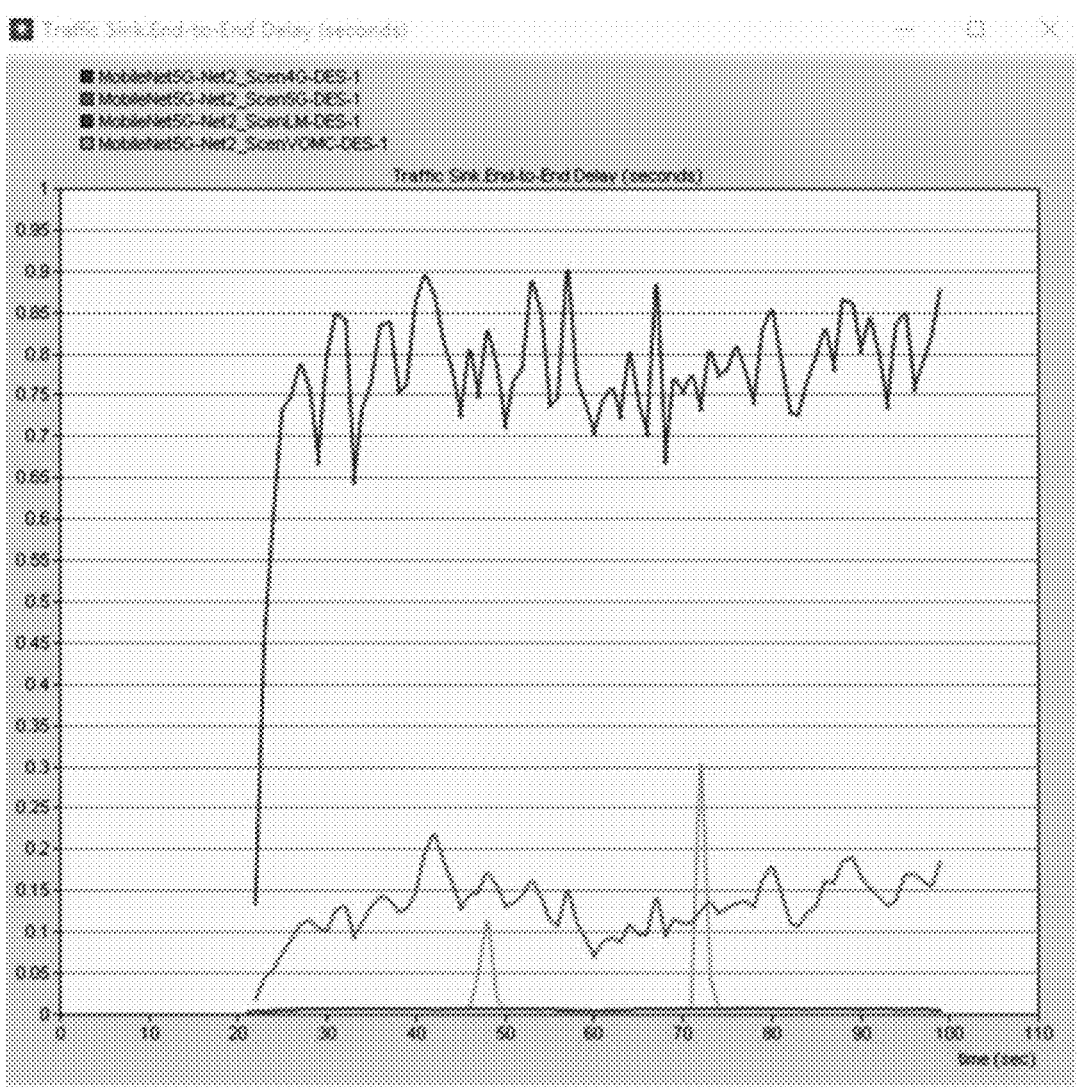
FIG. 10 is the end-to-end delay of the capacity coverage performance test simulation experiment of the present disclosure.

As shown in FIG. 10, end-to-end delay is defined as the delay between the creation of a packet and its arrival at the destination node. The end-to-end delay is shown in FIG. 10, the latency using LM-GM architecture is around 10 ms, and there will be significant latency jitter when using VOMC architecture and ordinary architecture. The use of ordinary 5G and 4G architectures has limited data bandwidth, resulting in increased latency.

Figure 11:
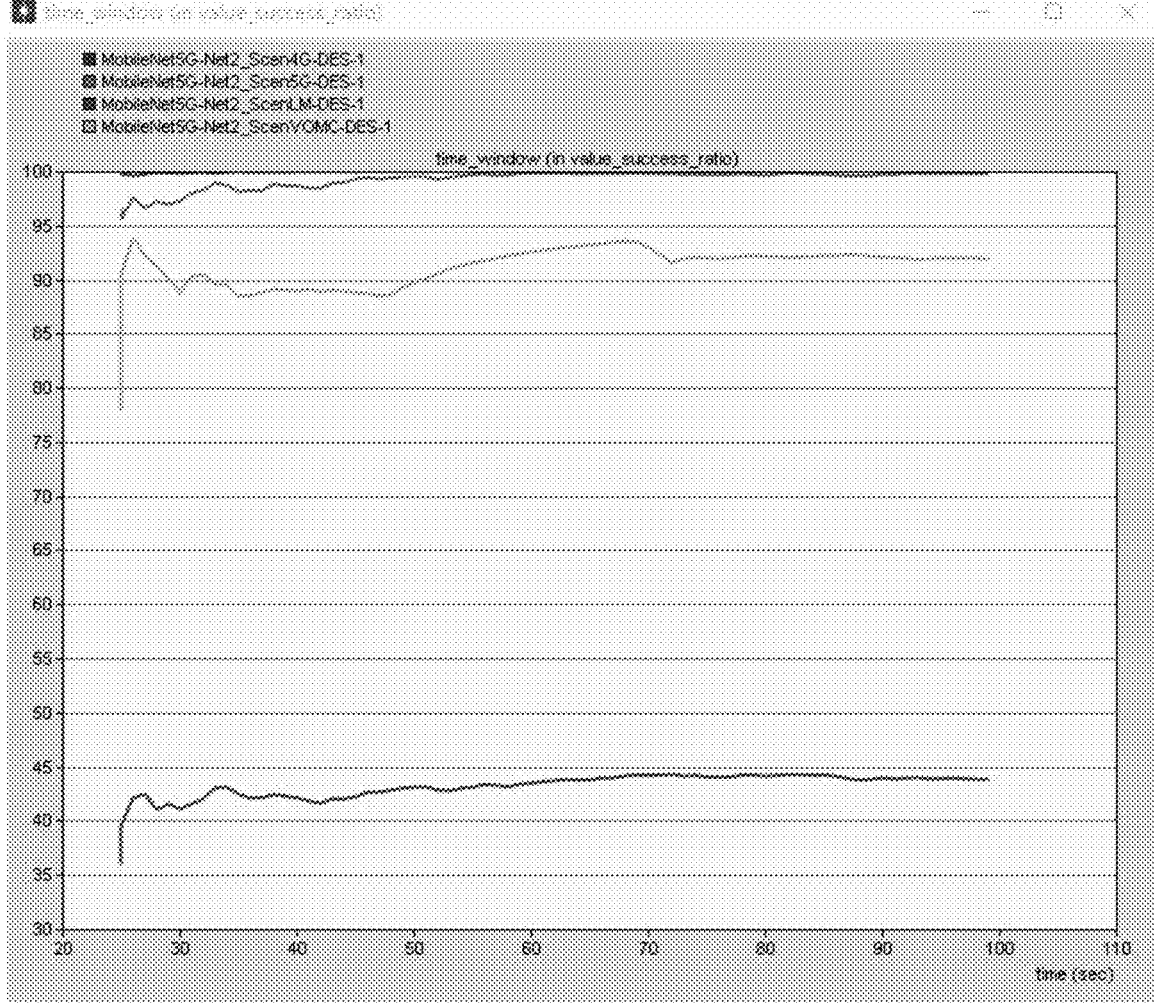
FIG. 11 is the success rate of data delivery in the capacity coverage performance test simulation experiment of the present disclosure.

As shown in FIG. 11, the success rate of data delivery is defined as the ratio of successfully received data to the total number of data packets sent. It can be seen that after adopting the LM-GM architecture, UAV nodes can provide timely support, and users can receive sufficient access resources, so the delivery rate remains at 100. When using the VOMC structure, UAV support is not timely enough, resulting in a decrease in success rate. When using an ordinary architecture, bandwidth is limited and the success rate decreases.

Figure 12:
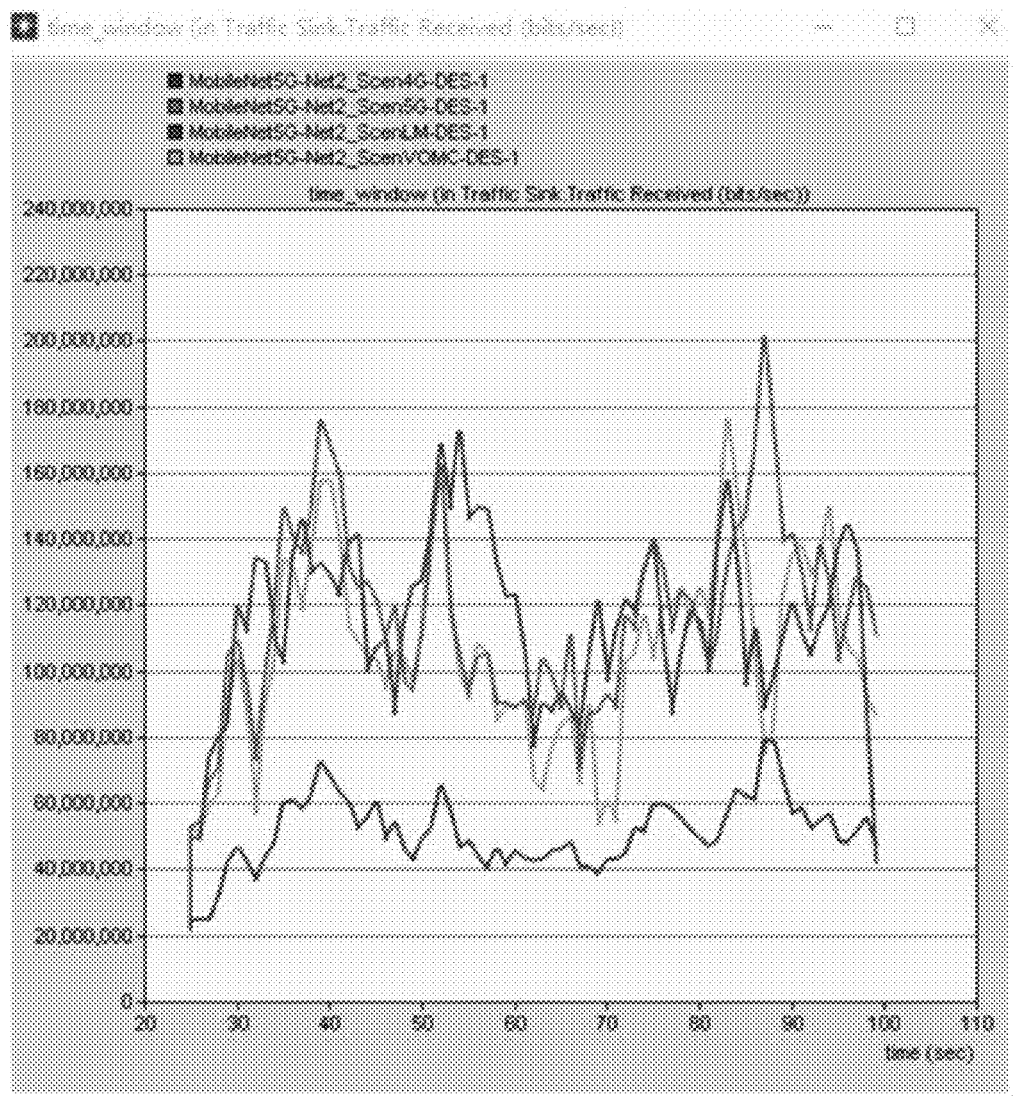
FIG. 12 is the throughput of the capacity coverage performance test simulation experiment of the present disclosure.

As shown in FIG. 12, throughput is defined as the amount of data delivered successfully per unit time. As shown in FIG. 12, the peak network throughput under the LM-GM architecture is around 180 Mbps. In the VOMC architecture, there may be resource shortages during node switching, resulting in a decrease in throughput. Adopting a 5G architecture, it basically meets the load requirements, but its throughput is not stable, resulting in an increase in business latency. The throughput of the 4G rate network has decreased and cannot meet the network load.

Although embodiments of the present disclosure have been shown and described, it can be understood by the ordinary skilled person in the art that multiple changes, modifications, substitutions, and variations can be made to these embodiments without departing from the principles and spirit of the present disclosure. The scope of the present disclosure is limited by the accompanying claims and their equivalents.

What is claimed is:

1. A new generation of network resource management architecture for coverage, comprising a network resource management architecture, wherein the network resource management architecture comprises a global resource orchestrator, a local resource orchestrator, a virtualization network management and maintenance unit, base stations, an user experience module and a controller with expanded protocol stack;

the base stations comprises a plurality of unmanned aerial vehicle (UAV) and ground base stations, wherein the plurality of UAV are configured as communication base stations for providing timely support, and jointly form resource cells on the access network side with the ground base stations;

the global resource orchestrator is deployed on a core network side and conduct overall management to the local resource orchestrator on an access network side;

the local resource orchestrator is deployed on the access network side, receives control data from the virtualization network management and maintenance unit, analyzes the data to generate an optimal resource cell coverage solutions combined with needs and indicators of different scenarios for various resource data and scenario data, and transmits the optimal resource cell coverage solutions to the virtualization network management and maintenance unit;

the virtualization network management and maintenance unit is located between the base stations and the local resource orchestrator; the virtualization network management and maintenance unit is configured to collect information about the base stations and the resource cells to report to the local resource orchestrator; and the virtualization network management and maintenance unit accepts resource cell adjustment solutions generated by the local resource orchestrator and adjusts the base stations and the resource cells based on the optimal resource cell coverage solutions generated by the local resource orchestrator;

the overall management of the local resource orchestrator by the global resource orchestrator comprises coordinating an operation of the local resource orchestrator, receiving information reported by the local resource orchestrator and feedback from the user experience module, and overall regulating a functional entity on the access network side based on the received information;

the global resource orchestrator and the local resource orchestrator are interconnected through next-generation application protocol (NGAP), NGAP services are applied to the information exchange between wireless access networks and core networks in communication networks; and the information interaction between the user experience module and the global resource orchestrator is achieved through non-access stratum (NAS); and the NAS protocol constitutes the highest layer of the control plane between the user experience module and the core network for third generation partnership project (3GPP) and non 3GPP access.

2. The new generation of network resource management architecture for coverage according to claim 1, wherein the local resource orchestrator comprises coverage configuration functional domain, coverage performance management functional domain, and data reception preprocessing functional domain.

3. The new generation of network resource management architecture for coverage according to claim 2, wherein the coverage configuration functional domain is configured to analyze and monitor a business configuration of a coverage business scene;

the coverage performance management functional domain is configured to analyze and predict a performance of the coverage business scene, and formulate a resource allocation adjustment solution for the resource cell; and the data reception preprocessing functional domain is configured to classify and process information and data received by the local resource orchestrator, and transmits the information and the data to various functional modules for internal requirements of the local resource orchestrator.

4. The new generation of network resource management architecture for coverage according to claim 3, wherein the coverage configuration functional domain comprises a coverage structure type generation module and a coverage monitoring feedback module; the coverage structure type generation module matches the reported scene information with standard data of various scenes stored inside the local resource orchestrator, generate a basic network configuration composition of the scene based on matching results, and send generated scene types to a resource control module and a coverage monitoring module;

the coverage monitoring feedback module is configured to detect various indicators, when the coverage structure type generation module generates scene types and sends the generated scene types to the coverage monitoring feedback module, and the coverage monitoring feedback module compares scene data with scene standards of target.

5. The new generation of network resource management architecture for coverage according to claim 4, wherein the coverage performance management functional domain is mainly responsible for coverage resource management and control of the virtualization network management and maintenance unit managed by the local resource orchestrator, and the coverage resource management and control comprises a channel prediction module, a resource reservation module, and a resource management and control module;

the channel prediction module is a functional module designed to ensure a quality of signal transmission, configured to predict qualities of several channels based on channel parameters, analyze path loss of each channel, calculate gain, and provide data for resource management;

the resource reservation module processes resource reservation services for different scenes; and the resource management module of the resource cell is configured to analyze and calculate received resource usage status, scene types and detection results, channel prediction results, and resource reservation results combined with a request of a virtual operation and maintenance center (vOMC) to generate a new resource cell generation solution and resource control solution.

6. The new generation of network resource management architecture for coverage according to claim 5, wherein the data reception preprocessing functional domain comprises a data reception module and a local resource panoramic representation module;

the data reception module is configured to receive all data and information received by the local resource orchestrator, classify the data based on identification of the received data, and send the classified data to required functional modules according to a protocol agreed upon between the data reception module and other local resource orchestrator functional module; and the local resource panoramic representation module is configured to convert a format of resource data, maps data in a data packet into a data table form using special mapping rules, and the functional module directly reads the resource data.

7. The new generation of network resource management architecture for coverage according to claim 1, wherein an unique temporary identifier is generated by the core network, namely a globally unique global management identifier (GUGMI) code, the global resource orchestrator assigns the GUGMI code to the user experience module, the global resource orchestrator registers with the network function repository functional entity, and synchronously submits mapping rules between the GUGMI code and the global resource orchestrator to the network function repository functional entity; a request signaling sent by the user experience module when accessing the core network comprises a GUGMI identification code, the global resource orchestrator that receives information from the user experience module requests mapping rules from the network function repository functional entity, and according to the GUGMI code reported by the user experience module, index the global resource orchestrator that the user experience module requests to connect to.

8. The new generation of network resource management architecture for coverage according to claim 7, wherein data interactions and signaling interactions in the core network adopt a hyper text transfer protocol; data and services provided by functional entities in the core network have attributes of resources in the hyper text transfer protocol; the hyper text transfer protocol provides an unified resource identifier for resources, and when there is a need for access by the functional entities, basic commands of using hyper text transfer protocol are transformed into a current signaling format of the core network through format conversion.

9. The new generation of network resource management architecture for coverage according to claim 1, wherein the virtualization network management and maintenance unit receives control from the local resource orchestrator, regulates the resource cell, and collects necessary data for the local resource orchestrator and transmits the collected data to the local resource orchestrator.

* * * * *